(No Model.) 2 Sheets—Sheet 1.
H. BEISHEIM.
HOLLOW AUGER.
No. 268,986. Patented Dec. 12, 1882.
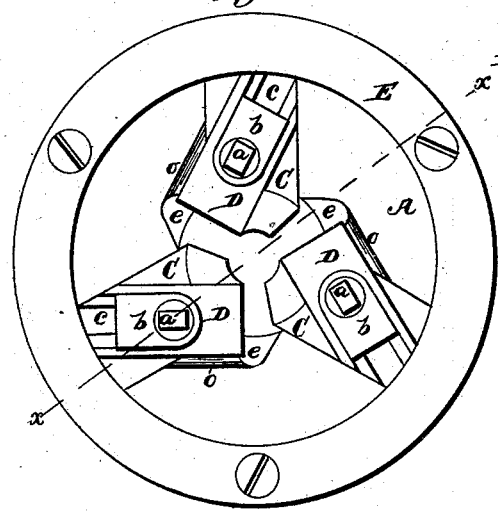
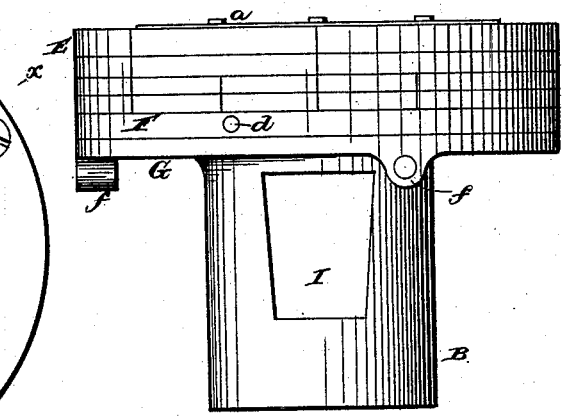
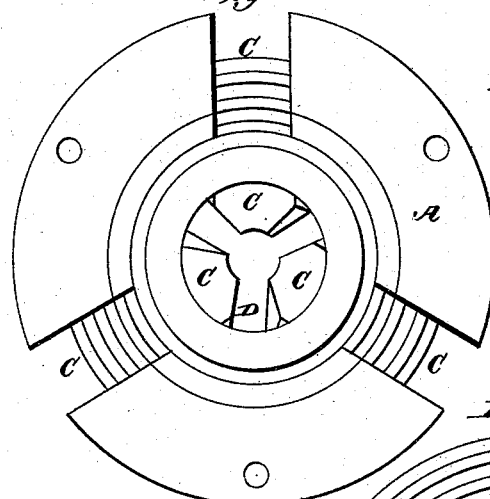
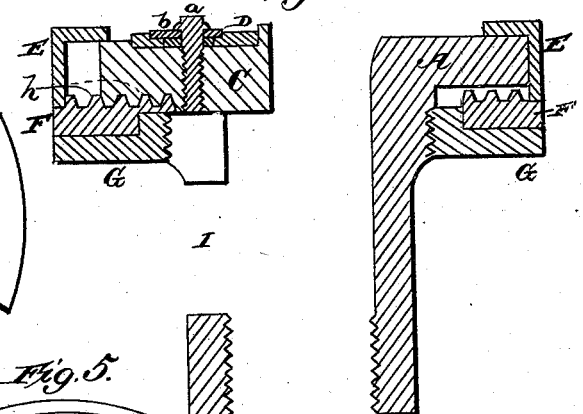
Witnesses
Robert Everett
J. A. Rutherford
Inventor:
Henry Beisheim.
By James L. Norris,
Atty.

(No Model.) 2 Sheets—Sheet 2.
H. BEISHEIM.
HOLLOW AUGER.
No. 268,986. Patented Dec. 12, 1882.
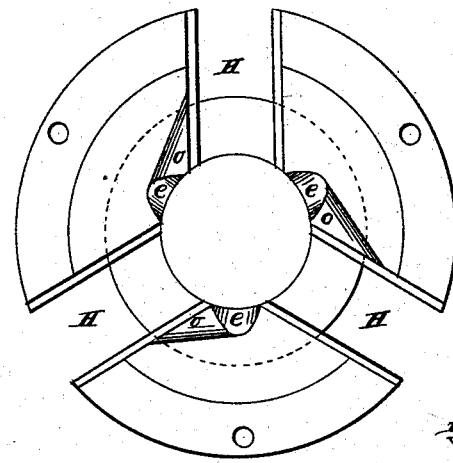
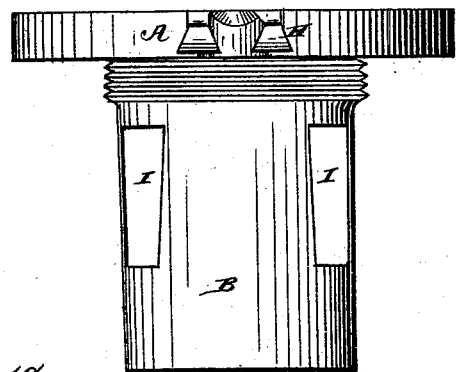
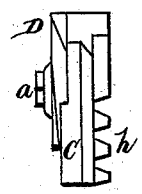
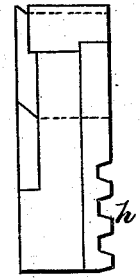
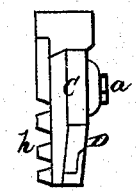
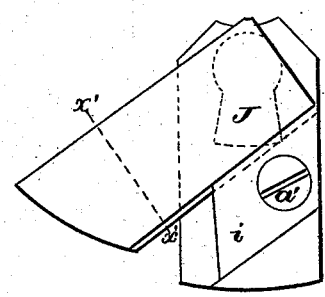
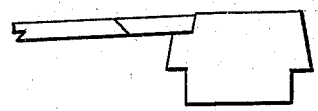
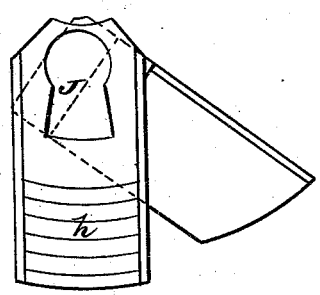
Witnesses,
Robert Everett
J. A. Rutherford
Inventor:
Henry Beisheim.
By James L. Norris
Atty.

UNITED STATES PATENT OFFICE.

HENRY BEISHEIM, OF CROWN POINT, NEW YORK.

HOLLOW AUGER.

SPECIFICATION forming part of Letters Patent No. 268,986, dated December 12, 1882;

Application filed January 29, 1881. Renewed January 13, 1882. (No model.)

*To all whom it may concern:*

Be it known that I, HENRY BEISHEIM, a citizen of the United States, residing at Crown Point, in the county of Essex and State of New York, have invented certain new and useful Improvements in Hollow Augers, of which the following is a specification.

This invention relates to improvements in hollow augers and cutter-heads for tenoning spokes or for other purposes, the object of the present invention being to provide improved means for adjusting the knife-carrying jaws, as well as means for attaching the knives to their slides.

The invention will be first described in detail and the improvements afterward set forth in the claims.

In the annexed drawings, which fully illustrate the invention, Figure 1 is a front elevation of my improved cutter-head. Fig. 2 is a side view. Fig. 3 is a rear elevation, the scroll being removed. Fig. 4 is a central longitudinal section on the line $x\ x$ of Fig. 1. Fig. 5 represents the scroll-ring detached. Fig. 6 shows one of the knives detached. Fig. 7 is a front elevation of the body of the cutter-head, the knives, &c., being removed. Fig. 8 is a side view of the same. Figs. 9, 11, and 18 are side and end views of one of the knives and the sliding jaw which carries it, and Figs. 10, 12, 13, 14, 15, 16, and 17 are different views of a modified form of knife and jaw.

My improved cutter-head for spoke-tenoning machines is represented in the accompanying drawings, in which A is the body of the cutter-head and B the screw-socket by which it is attached to the spindle of a lathe or other similar machine. C C C are the sliding knife-carrying jaws. D D D are the knives; E, the flange-ring surrounding the cutter-head; F, the scroll-ring; and G, the screw-collar, by means of which the scroll-ring is held in place.

The body of the cutter-head consists of the screw-socket B, which is provided with lateral openings I for the escape of the chips, and also with a circular flange or collar having three radial slots cut through it to receive the sliding jaws C. The slots or grooves H H are dovetailed in section, being made of a form to correspond with that of the jaws C, as shown in the end view, Fig. 18. On their rotary faces the jaws C C are provided with diagonal grooves $c\ c$, Fig. 1, into which the knives D D are fitted and adjustably secured in place by the screws $a$ and collars $b$. The inner ends of the jaws are curved to correspond with the shape of the tenon on the spoke. The margin of the opening through the body of the cutter-head is beveled inward, as shown at $e$ and $o$ in Fig. 7, to afford room for the passage of the chips. The inner faces of the sliding jaws C are provided with teeth $h$, which engage with the corresponding teeth on the scroll-ring F. These teeth or ridges on the scroll-ring and sliding jaws form threads which are preferably V-shaped in cross-section, thus causing the sliding jaws to come always exactly in the same position whether they are moved in or out, as the V-threads will wedge into each other and hold the sliding jaws with a uniform degree of tightness in various positions without liability of becoming loose or working shaky.

The scroll-ring F is held in place against the flange portion of the cutter-head by the screw-collar G, which is preferably shouldered or centered thereon, as shown in the sectional views, Fig. 4. The collar G screws onto the socket of the cutter-head, as shown in Fig. 4, for the purpose of securing the jaws and scroll-rings in place. The periphery of the scroll-ring F is provided with one or more holes, $d$, for the insertion of the rods or levers, by which it may be rotated for the purpose of adjusting the radial portion of the jaws and knives, and the screw-collar G has perforated lugs $f$, by which it is revolved or turned into place.

In Figs. 10, 12, 13, 14, 15, 16, and 17 is illustrated a modified form of the sliding jaw and knife, the inner end of the jaw being provided with an opening, J, for the escape of chips, and the knife D (shown in section in Fig. 17 on the line $x'\ x'$, Fig. 12) being secured to the jaw by a dovetail groove on one side and a beveled block, $i$, fastened by a screw, $a'$, on the other. Fig. 10 is a side view of this modified form of knife, as seen from the right hand in the front view, Fig. 12. Fig. 13 represents the jaw and knife, as seen from the opposite side. Fig. 14 shows the jaw and knife, as seen from its inner face, and Figs. 15 and 16 are end views of the same.

In the practical operation of my improved device for tenoning spokes the cutter-head is preferably secured on a rotating mandrel, and the spokes are fed against the knives or cutters by any suitable means. The cutter-head may also be operated by hand, being secured to a brace by screwing onto the same or by means of a suitable connecting-socket. The flange-collar, projecting inward over the outer ends of the knife-slides, assist in holding the same in place when clamped by the screw-ring G, and forms a smooth outer surface of the cutter-head, thereby preventing accidents to the operator's hands, which are liable to occur when the cutter-head is unprotected.

It is obvious that one or two cutters may be used in my improved cutter-head without materially altering its mode of operation. It will also be seen that the cutters may be used for straight turning and other like purposes, as well as for tenoning spokes.

In order to adjust the cutters to varying diameters of work to be accomplished it will be observed that the flange-collar and scroll-ring are indexed or graduated to a suitable scale, so that any required diameter may be obtained without the usual necessity of making special measurements. A starting-point or zero is marked on the scroll-ring, from which measurements may be reckoned. By moving the ring once around it will close or open the cutters one-half or one inch, as the case may be, and by moving the ring to a greater or less extent the diameter may be increased or diminished, as required, the diameter thus attained being shown in inches upon the scale marked on the flange-collar.

Having thus described my invention, what I claim is—

1. The combination, with a cutter-head, of a sliding knife-carrying jaw, a scroll-ring, a screw-collar, and a flange-collar projecting over the face of the cutter-head, substantially as shown and described.

2. The combination, with a cutter-head, of a sliding jaw having V-threads on its inner face, a knife secured diagonally on said jaw, a screw-ring having V-threads corresponding with the threads on the sliding jaws, a screw-collar centered on said scroll-ring and adapted to hold the same in place, and a flange-collar projecting over the face of the cutter-head, substantially as shown and described.

HENRY BEISHEIM.

Witnesses:
H. G. PHILLIPS,
W. H. WALKER.